United States Patent [19]
Catlin

[11] 3,848,859
[45] Nov. 19, 1974

[54] CONTINUOUS QUENCHING MEANS FOR A MOVING WIRE

[75] Inventor: Robert T. Catlin, Trumbull, Conn.

[73] Assignee: Remington Arms Company, Inc., Bridgeport, Conn.

[22] Filed: Apr. 30, 1973

[21] Appl. No.: 355,773

[52] U.S. Cl. ............................ 266/3 R, 118/404
[51] Int. Cl. ................................... C21d 9/52
[58] Field of Search ............ 266/4 A, 3 R; 118/404, 118/405

[56] References Cited
UNITED STATES PATENTS

| | | | |
|---|---|---|---|
| 2,787,980 | 4/1957 | McDermott | 118/405 |
| 3,227,577 | 1/1966 | Baessler et al. | 118/405 UX |
| 3,543,722 | 12/1970 | Bos et al. | 118/405 X |
| 3,727,895 | 4/1973 | Wondergem | 266/3 R |
| 3,735,967 | 5/1973 | Brown et al. | 266/3 R |

FOREIGN PATENTS OR APPLICATIONS

| | | | |
|---|---|---|---|
| 906,349 | 9/1962 | Great Britain | 266/3 R |

*Primary Examiner*—Roy Lake
*Assistant Examiner*—Paul A. Bell
*Attorney, Agent, or Firm*—John H. Lewis, Jr.; Nicholas Skovran; Joel D. Talcott

[57] ABSTRACT

A quenching device for a heat treatment operation includes a chamber containing a predetermined quantity of quenching fluid. A pair of aligned access openings accommodate the vertical passage of an abrasive-coated wire or band, which at entry into the chamber has been heated above the austenizing temperature, through the chamber. To accommodate the irregular outer surface of the wire or band, both the upper and lower access openings are preferably of sufficiently large dimensions to prevent any significant contact between the housing and the wire. A pneumatic sealing means maintains a gas pressure within the lower one of the access openings at a level which prevents the leakage of water outward through the opening.

4 Claims, 3 Drawing Figures

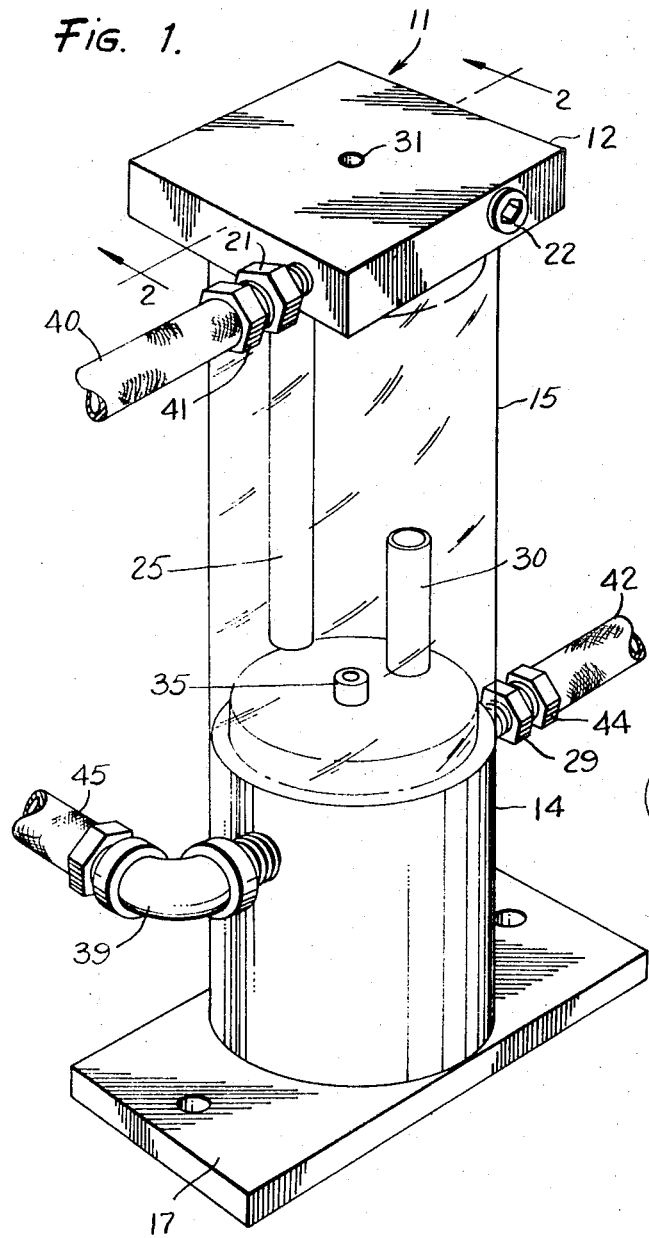
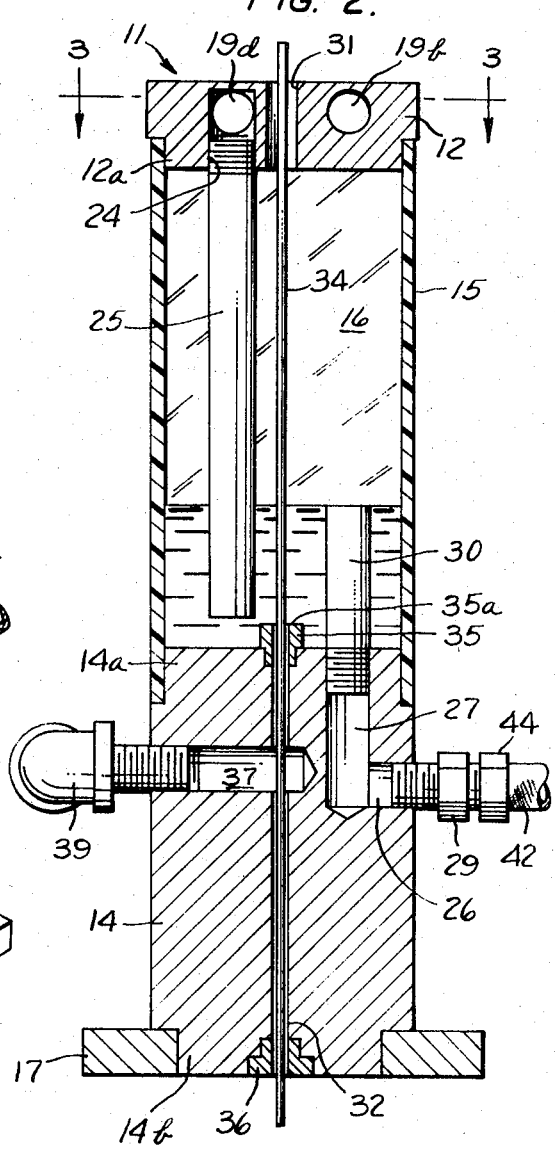
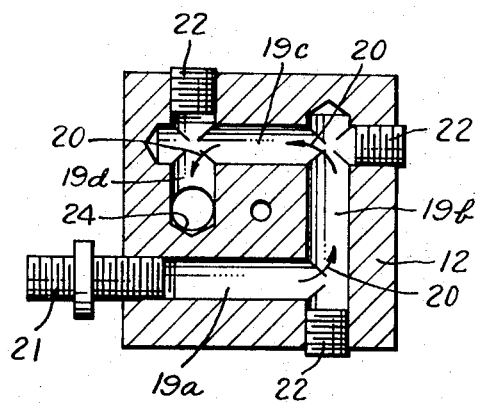

CONTINUOUS QUENCHING MEANS FOR A MOVING WIRE

This application relates to quenching apparatus and more particularly to a device for continuously fluid quenching a moving member which is coated by a layer of abrasive particles or otherwise provided with an irregular outer surface.

Abrasive rod saws, such as are disclosed in U.S. Pat. No. 3,449,146, issued to Chester H. Dawson on June 10, 1969, have, in recent years, come into wide use due to their versatility and cutting ability. These rod saws are manufactured by coating a wire with a suitable flux, brazing alloy and a refractory powder or grit and, after drying, inductively heating the coated wire to form a structurally strong unit. Subsequent quenching and tempering provides the necessary hardness and strength characteristics for the wire. U.S. Pat. application Ser. No. 220,294, filed Jan. 24, 1972 by Paul V. Whitney, Jr., Robert J. Bolen and William W. Cotter, Jr., and assigned to the assignee of this invention, discloses a method and apparatus for continuously producing such rod saws. This apparatus generally consists of a straightener, a cleaner, a flux and brazing alloy coater, a grit coater, a drying oven, an induction heater and a jet air quencher, all of which are aligned to receive and work on a continuous wire. Because the entire surface of the wire is coated by flux and grit, it is important that the coatings be uniformly applied to the surface and that no significant contact be made with the wire after the final cleaning step and until completion of induction heating and quenching. To satisfy these requirements, the wire is fed vertically downward in a straight line through the apparatus performing these functions.

Although it is desirable to fluid quench the wire after it has been induction heated, it has previously been necessary to air quench due to the problems inherent in fluid quenching a vertically moving continuous wire, particularly one having a highly irregular and abrasive surface.

Because the wire is moving vertically, it must pass through the bottom of any fluid quenching device. Additionally, due to the irregular and abrasive surface, the openings through which the wire passes must be of sufficiently large diameter to prevent any significant contact with the wire, it being readily apparent that such contact with the highly abrasive surface of the wire would produce significant wear and possible serious damage to the apparatus. Clearly, such an opening in the bottom of a quenching device would permit large quantities of fluid to pass therethrough, thus rendering such a quenching device highly impractical.

A similar problem may occur in the manufacture or treatment of band saws or any other moving member, particularly one having an irregular or abrasive outer surface, which must be fluid quenched while moving in a vertical direction.

In accordance with this invention, a quenching device has a vertical passage through a fluid containing cavity permitting a continuous member to be passed through the fluid. The passage includes upper and lower openings in a housing of the quenching device, which openings are of suitable shape to accommodate the moving member and sufficiently large to permit the member to pass therethrough without significant contact with the sides of the openings. A pneumatic seal is provided in the lower opening for maintaining a sufficiently high pressure to prevent any fluid from passing through the opening while permitting free passage of the member. Fluid circulating means may be provided to maintain a desired temperature for the fluid.

It is an object of this invention to provide a quenching device for fluid quenching a continuous member which is moving in a vertical direction.

It is a further object of this invention to provide a quenching device for water quenching a vertically moving wire having an abrasive surface.

It is a still further object of this invention to provide a quenching device for water quenching a vertically moving wire and preventing water leakage without significant contact with the outer surface of the wire.

These and other objects and advantages of this invention will be readily understood when the following specification is read in conjunction with the appended drawings, wherein:

FIG. 1 is a perspective view of a water quenching device in accordance with this invention;

FIG. 2 is a vertical cross-sectional view of the water quenching device of FIG. 1 taken generally along the lines 2—2 of FIG. 1; and FIG. 3 is a cross-sectional view of the water quenching device taken generally along the lines 3—3 of FIG. 2.

Referring now to the drawings, a wire quenching device 11, made in accordance with this invention, has an upper base 12 and a lower base 14 which are preferably formed of brass or other suitable material in any desired shape. A chamber wall 15, which may be generally tubular, joins the upper base 12 to the lower base 14 and may be made of a transparent material, such as a suitable plastic, if it is desirable to visually examine a quenching chamber 16 defined thereby. A lower portion 12a of the upper base and an upper portion 14a of the lower base are preferably generally cylindrical and have diameters approximately equal to the inner diameter of the chamber wall 15 so that the chamber wall 15 may be secured to both the upper base 12 and lower base 14 in a force-fitting relationship. A mounting plate 17 is preferably secured to the lower base 14 and may be brazed or otherwise suitably attached to a lower portion 14b (FIG. 2) of reduced diameter.

A plurality of passages 19a–d, best seen in FIG. 3, are preferably bored in the upper base 12 and intersect to form a continuous path as shown by arrows 20. The outer end portions of the passages 19a–d are preferably tapped to accommodate suitable threaded inserts, a threaded hose connector 21 being secured in the passage 19a and threaded blocking plugs 22 being secured in the passages 19b–d. The blocking plugs 22 close off the outer ends of the passages 19b–d so that water or other fluid introduced through the hose connector 21 into the open outer end portion of the passage 19a will be directed along the path shown by the arrows 20 to the inner end portion of the passage 19d. To accommodate the further passage of fluid, a vertical passage 24 is bored through the lower portion 12a of the upper base 12 intersecting the passage 19d. This passage is also tapped and a fluid inlet pipe 25 of predetermined length is threaded therein.

Intersecting horizontal and vertical passages 26 and 27, respectively, are bored in the lower base 14. An outer portion of the horizontal passage 26 is threaded to accommodate a hose connector 29 and an upper portion of the vertical passage 27 is threaded to permit attachment of a fluid outlet pipe 30 of predetermined length.

A pair of longitudinally aligned axial passages 31 and 32 (FIG. 2) are drilled or otherwise formed in the upper base 12 and lower base 14, respectively. The passages 31 and 32 may be of the same diameter and are preferably precisely collinear so that a wire, such as wire 34 in FIG. 2, may pass through the passage 31, the quenching chamber 16 and the passage 32 without interaction between the outer surface of the wire 34 and the surfaces of the passages 31 and 32. If desired, an upper guide bushing 35 and a lower guide bushing 36 may be respectively fitted in the upper and lower ends of the passage 32.

A horizontal air passage 37 is drilled radially into the lower base 14 to a depth sufficient to intersect the passage 32. An outer end portion of the air passage 37 is threaded to accommodate connection of a hose connector 39.

To facilitate quenching operation, the hose connector 21 in the passage 19a has a hose 40 secured thereto by a suitable connector 41. The hose 40 is preferably connected to a source of a quenching fluid, such as water (not shown). A hose 42 is connected to the hose connector 29 in the horizontal passage 26 by a suitable attachment means 44. The hose 42 may be connected to a cooling means for cooling the water before it is returned to the quenching device 11 by way of the hose 40 or it may be connected to a suitable drain for disposal of the water.

During operation of the quenching device 11, the wire 34, which has been coated with a flux paste adhesive and brazing metal powders, overcoated with abrasive particles and then heated by a suitable heating means, such as an induction coil (not shown), to a temperature of approximately 1900° to 2000°F., enters the quenching device 11 through the passage 31, passes through the quenching chamber 16 and the water contained therein, and leaves the quenching device 11 by way of the passage 32. While passing through the passage 31 in the upper base 12, the wire 34 is still at a temperature generally greater than about 1750°F. Clearly, a significant amount of radiated heat will be imparted to the upper base 12 causing an undesirable increase in temperature. Accordingly, the water entering the quenching device 11 from the hose 40 and the hose connector 21 is directed through the passages 19a–d (FIG. 3) prior to entering the quenching chamber 16, thus absorbing the excess heat from the upper base 12 and permitting it to remain at a controlled temperature.

The water in the passage 19d flows downwardly through the fluid inlet pipe 25 into the quenching chamber 16. From the quenching chamber 16, the water flows into the fluid outlet pipe 30 and through the passages 27 and 26 to the hose 42 for recirculation or disposal as previously described. It will be readily apparent that the depth of water maintained in the quenching chamber 16 is controlled by the height of the fluid outlet pipe 30. Water is flowing into the quenching chamber 16 from the fluid inlet pipe 25 at a uniform rate and cannot drain from the quenching chamber until the depth of the water is at least as great as the height of the fluid outlet pipe 30. Upon reaching the top of the pipe, the fluid can flow from the chamber. As long as the flow through the fluid inlet pipe 25 is maintained at a rate no greater than can be accommodated by the fluid outlet pipe 30 and hose 42, the water depth will be generally equal to the height of the fluid outlet pipe 30. In the preferred embodiment, the fluid inlet pipe 25 is of sufficient length that its lower end portion is lower than the upper end portion of the fluid outlet pipe 30. This minimizes any turbulence caused by the addition of fluid to the quenching chamber 16 and provides proper water circulation by adding the cooler water at the bottom and withdrawing the less dense heated fluid from the top.

By utilizing the quenching device 11, rod saws may be manufactured from inexpensive steel having a relatively low carbon content. One such material is a welding rod which is marketed by the Linde Division of the Union Carbide Corp. under the designation 32 CMS. This material has a carbon content of about 0.12 percent and cannot be given sufficient hardness and strength by air quenching. However, moving downward at a rate of about 4.5 to 5 feet per minute through the quenching device 11, its temperature is lowered from an initial value in excess of 1600°F., at which temperature the steel is in the form of austenite, to the temperature of the quenching fluid in about 2–3 seconds. This rapid temperature drop results in this low carbon content wire obtaining a martensite structure with the high strength and hardness characteristics required for use as a rod saw. The quenched wire 34 passes through the passage 32 in the lower base 14 of the quenching device 11 and is brought from there to other equipment for tempering the wire and cutting it into desired lengths as shown in the above-mentioned application Ser. No. 220,294.

In order to prevent the passage of water from the quenching chamber 16 through the passage 32, pneumatic sealing means including the air passage 37 is provided in the lower base 14 in a position intersecting the passage 32. In the preferred embodiment, an air hose 45 (FIG. 1) is connected between the hose connector 39 and a source of compressed air (not shown) which includes means for regulating the air pressure in the air passage 37. By the use of this air pressure regulating means, the air passage 37 is maintained at a pressure slightly greater than the water pressure at the upper surface 35a of the upper guide bushing 35. To accomplish this, the air passage 37 must be located at a position of the lower base 14 sufficiently distant from the lower end portion of the passage 32 that an adequate back pressure will result in the passage 32 permitting the air pressure in the passage 32 at the surface 35a to be maintained at a level just exceeding the water pressure at that surface. It will be readily understood by those skilled in the art that maintaining the air pressure at the air-water interface at a level just slightly greater than the water pressure will prevent the entry of water into the passage 32, thereby sealing the passage without a solid physical barrier. It is important, however, to prevent the air pressure from becoming significantly greater than the water pressure because this could produce excessive bubbling in the quenching chamber 16, which might interfere with the quenching of the wire 34.

If the chamber wall 15 is made of a transparent material, such as a clear plastic, the air pressure may be simply and accurately regulated by adjusting the air flow until a very slow but steady stream of bubbles emerges from the passage 32, through the upper guide bushing 35. This condition shows that the air pressure at the air-water interface is just slightly greater than the water pressure and thus demonstrates effective water-sealing of the passage 32. Periodic examination and adjustment of the air flow rate will ensure that an adequate water seal is maintained.

It can be readily seen that the use of this pneumatic sealing means prevents leakage of water through the passage 32 while permitting a sufficiently large opening to be maintained to permit the abrasive coated wire 34 to pass therethrough without significant contact with the walls of the passage and thus without damage. If desired, fluids other than water and air may be substituted for performing the quenching and sealing functions without departing from either the spirit or scope of this invention. For example, oil may be used as the quenching fluid instead of water, providing the pressure of the pneumatic sealing means is adjusted to compensate for the difference in density between the oil and water, and, instead of air, a neutral gas such as nitrogen could be used in the pneumatic sealing means. Additionally, while the quenching device 11, described in detail, is designed for quenching a moving wire, it will be readily apparent that, by changing the cross-sectional shapes of the passages 31 and 32, other shapes of continuous members may be accommodated.

I claim:

1. A quenching apparatus for quenching a continuously moving member in a liquid, said apparatus comprising a housing having a chamber for containing a quenching fluid and having an upper base containing an upper access opening, a lower access opening aligned with the upper access opening to define a path for the member passing through the chamber, pneumatic sealing means for preventing the passage of quenching fluid and permitting the passage of the member through the lower access opening, and a cooling passage in the upper base having end portions and connected at one end portion to a fluid inlet pipe extending into said chamber and at another end portion to a source of said quenching fluid, the cooling passage being disposed to direct said quenching fluid a substantial circumferential distance around said upper access opening before said quenching fluid enters the fluid inlet pipe.

2. The quenching apparatus of claim 1 wherein a fluid removal means is attached to said housing and a fluid outlet pipe is mounted in said chamber in communication with the fluid removal means.

3. The quenching apparatus of claim 2 wherein said fluid outlet pipe extends a predetermined length into said chamber to control the depth of said quenching fluid.

4. The quenching apparatus of claim 2 wherein said fluid removal means is connected to a thermal means for controlling the temperature of said quenching fluid and the thermal means is connected to said source of quenching fluid for returning the quenching fluid to said chamber.

* * * * *